Aug. 15, 1967  J. DONIGER ET AL  3,335,980
AIRCRAFT LANDING SYSTEM INCLUDING DESENSITIZATION MEANS
Filed March 4, 1965  3 Sheets-Sheet 1

FIG. 1

INVENTORS
JERRY DONIGER
RAYMOND KOSTANTY
BY Herbert L. Davis
ATTORNEY

FIG. 2

INVENTORS
JERRY DONIGER
RAYMOND KOSTANTY
BY
ATTORNEY

EFFECTIVE TERRAIN VARIATIONS

United States Patent Office 3,335,980
Patented Aug. 15, 1967

3,335,980
AIRCRAFT LANDING SYSTEM INCLUDING DESENSITIZATION MEANS
Jerry Doniger, Montvale, and Raymond Kostanty, Jersey City, N.J., assignors to The Bendix Corporation, Teterboro, N.J., a corporation of Delaware
Filed Mar. 4, 1965, Ser. No. 437,061
16 Claims. (Cl. 244—77)

This invention relates to an altitude responsive aircraft landing system including desensitization means for reducing the effective increase in gain on the landing system as the aircraft nears the runway as a function of radio altitude, and more particularly to a novel landing control mechanism including airborne altitude responsive means to minimize the effects of altitude variations on the basic parameter adjustment capability of the invention by inhibiting the operation of the landing control mechanism upon an increase in the sensed altitude. The mechanism remains effective upon a sensed decrease in the altitude of the aircraft to progressively lower the desired parameters of the aircraft instrument landing system to match the increase gain effect due to the converging geometry of the transmitted guidance beams. The inhibiting means of the present invention is effective upon an increase in the sensed altitude of the aircraft to maintain the gain parameter of the last minimum sensed altitude effective until such time as the sensed altitude decreases below the last sensed minimum value.

Heretofore, instrument landing systems utilized in commercial and military approaches of an aircraft to a landing runway have operated in response to beam error signals effective at a glide path receiver and localizer receiver carrier by the aircraft to generate electrical control signals proportional to the vertical path and horizontal course angular error of the aircraft in flight from a preset line in space which may be inclined from the horizontal by, for example, a nominal three degrees to provide a descent path terminating on the runway. The absolute position of the course path line is usually not known nor is the distance of the aircraft to the runway.

In such previous systems, approach couplers may operate through an automatic pilot or flight director system so as to utilize guidance beam error signals to guide the aircraft to the runway. It has been found, however, that as the distance to the runway decreases the indicated beam error increases for a given vertical or horizontal offset. It has been concluded from such discovery that there is a general increase in the gain of the coupler system as the runway is approached in the landing of the aircraft. In recognition of this change in the gain of the coupler system, such coupler systems have heretofore been so arranged as to decrease the gain thereof as the runway is approached in an attempt to match the increase in the gain of the coupler system due to the converging geometry of the transmitted beams.

Several techniques have been used in the past to provide this matching effect, including the following:

(1) Use of constant gains which degrade performance in the early portion of the approach of the aircraft for effecting an improved performance of the aircraft at the later stages of the flight near the runway.

(2) Use of discrete gain switching as a function of the time to go to the runway so as to assure an initial average time to the runway when the descent begins. However, here again only compromises can be accomplished in generating the proper gain program.

(3) The use of means for clutching into operation a barometric pressure altitude responsive means at a preselected nominal altitude of the aircraft, to program the gain of the landing system so that the gain is nominally correct at low altitudes in approaching the runway. Off nominal initial altitude conditions have been found, however, to degrade the performance of the landing system at low altitudes.

(4) The use of barometric pressure altitude prevailing in the aircraft at the level of flight and at the runway so as to effectively program the gain of the landing system which requires a presetting of both the runway elevation and pressure correction in the aircraft prior to descent of the aircraft to the runway.

An object of the present invention is to provide a novel altitude responsive desensitizing means for a landing system of an aircraft to provide a predetermined gain changing program for the landing system as the aircraft approaches the runway so as to provide a correct gain in the system at low altitudes irrespective of the initial altitude of the aircraft in the approach to the runway.

Another object of the invention is to provide a novel radio altitude responsive aircraft landing system, including a novel device for desensitizing a gain varying means in an approach coupler of the system so arranged as to minimize the effect of terrain variations on fluctuations in the approach coupler gain parameters.

Another object of the invention is to provide in such a system a novel desensitizing device to minimize the effects of terrain variations on the gain and limit setting functions of the system.

Another object of the invention is to provide in such a device novel means for rendering the output of the device effective to follow primarily decreasing input altitude signals, while the output under increasing altitude signals will be held at a value equivalent to the last minimum value of the input altitude signal until the last input altitude signal falls below such last value.

Another object of the invention is to provide an electronic desensitizing device to minimize the effects of terrain variations on the gain and limit setting functions of an altitude responsive aircraft landing system.

Another object of the invention is to provide in such an electronic desensitizing device novel means for applying an input signal from a radio altimeter through limit and lag circuits so as to provide an output signal which lags the input signal, but which may be proportional to the radio altimeter signal, together with novel means for setting the input limiter in response to the output signal so that as the radio altitude signal is reduced during a normal approach over flat terrain the limiter will be set by the output signal voltage so as to permit the passage of an input signal of approximately the same voltage. The arrangement is such, however, that if the terrain over which the aircraft is passing in the approach to the landing runway is uneven, and if there is a momentary increase in the radio altitude signal as, for example, a result of passing over a valley, the limiter will be so reset by the lagging output signal as to tend to limit the radio altitude input signal so as to prevent, partially or completely, the output of the limiter from following the resulting increase in the radio altitude signal. On the other hand, if the aircraft were to pass over a hill during the landing approach, the radio altitude signal would momentarily decrease more rapidly and the output voltage of the limiter in this case would be less than that for the previous altitude, whereupon the lag circuit would follow this reduction in altitude within preset rate limits. Thus, through the aforenoted arrangement of the novel electronic desensitizing means, increases in altitude sensed by the radio altimeter may be rejected while the effects of rapid reductions in altitude sensed thereby may be effectively attenuated. Moreover, since the normal rate of change of altitude of conventional aircraft in approaching the landing runway is, for example, about ten feet per second, the preset rate of descent limit provided by the limiter circuit of the novel electronic desensitizing device may be set to, for example, about thirty feet per second to provide reasonable synchronization and reset time intervals.

Another object of the invention is to provide a novel electromechanical desensitizing device to minimize the effects of terrain variation on the gain and limit setting functions of the altitude responsive aircraft landing system.

Another object of the invention is to provide in such an aircraft landing system an electromechanical desensitizing device including a novel electromechanical servo to provide desirable time lag and rate limiting functions in response to a radio altitude signal and a desensitizing device which operates in a conventional manner when the radio altitude signal voltage is being reduced as the sensed altitude decreases; the desensitizing device further including a phase sensitive detector so arranged that when the radio altimeter voltage increases with the sensed altitude, as in the case of a flight of the aircraft over a valley in approaching the runway, the phase of the controlling signal effected by the altitude increasing signal is such that the phase sensitive detector is effective to, partially or completely, inhibit the passage of such controlling signal to the servo, thus preventing operation of the servo in an altitude increasing sense; the phase sensitive detector is further so arranged that upon the radio altitude voltage signal being reduced in response to a decrease in the sensed altitude below the previous minimum sensed altitude, the phase of the controlling signal effected by such altitude decreasing signal is then of an opposite phase such that the phase sensitive detector is then effective to permit the passage of such controlling signal of opposite phase to the servo so that the servo again follows the sensed altitude signal in said decreasing sense; and the electromechanical servo further includes a tachometer feedback, a position feedback and servo motor having a maximum speed so selected as to provide the desirable time lag and rate limit functions permitting the electromechanical servo to accurately follow the decreasing radio altitude signals.

Another object of the invention is to provide a novel desensitizing device for use with an altitude responsive aircraft landing system so arranged as to permit, partially or completely, an output signal from following increasing altitude sensed excursions and including means providing time lag constants and rate limiting so arranged as to prevent excessively fast changes in the output signal in the event of a rapidly decreasing sensed altitude.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings, corresponding parts have been indicated by corresponding numerals.

Figure 1:
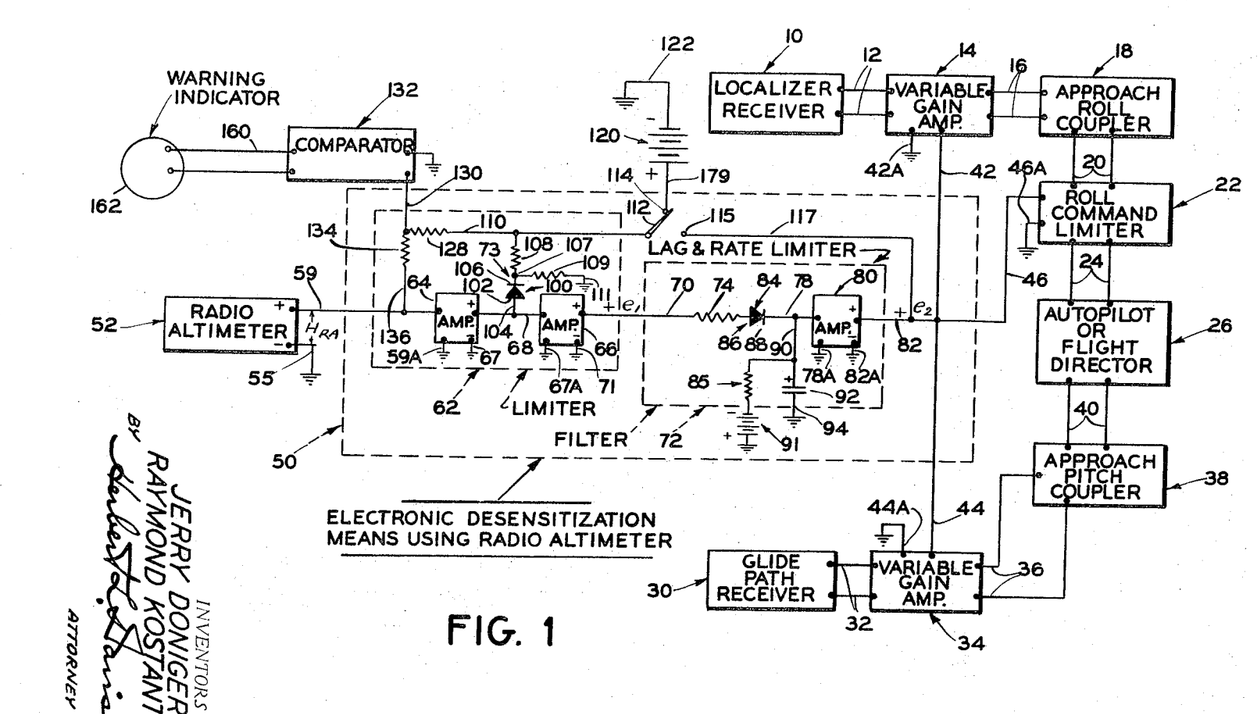
FIGURE 1 is a wiring diagram of an electronic desensitization device embodying the present invention and shown in cooperative relation with an altitude responsive aircraft landing system.

There is shown in the wiring diagram of FIGURE 1 an electronic desensitization means 50 which is the subject matter of a divisional U.S. application Serial No. 609,519, filed January 16, 1967, by Jerry Doniger and Raymond Kostanty and assigned to The Bendix Corporation, assignee of the invention described and claimed herein.

*Electronic desensitization means*

Referring to the wiring diagram of FIGURE 1, there is indicated by the numeral 10 a conventional localizer beam receiver for controlling the flight of an aircraft in a landing operation. The localizer beam receiver 10 is operatively connected through suitable electrical output conductors 12 to the input of a conventional variable gain amplifier 14 having output conductors 16 connected to the input of a conventional approach roll coupler 18.

The approach roll coupler 18 is in turn connected through output conductors 20 to the input of a roll command limiter 22 having output conductors 24 leading to an input of an autopilot or flight director 26 for controlling the roll of an aircraft about a roll axis thereof in a conventional manner. The localizer beam receiver 10 provides suitable control signals in response to horizontal course angular errors sensed thereby in a conventional manner from preset lines or converging beams in space transmitted from suitable ground based transmitting equipment which also may be of a conventional type.

Figure 3:
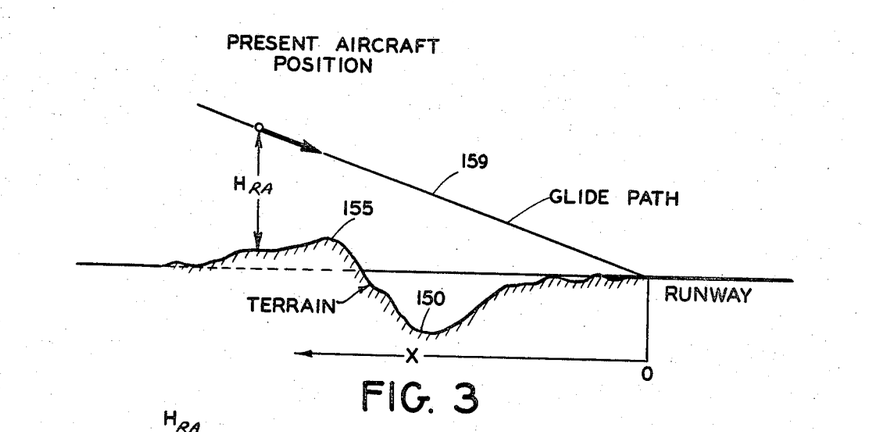
FIGURE 3 illustrates pictorially the passage of an aircraft glide path over a valley in approaching a landing runway and which would be sensed by an airborne radio altimeter as an increase in the effective altitude of the aircraft.

There is similarly provided a glide path beam receiver 30 of conventional type arranged to generate electrical output signals which are proportional to the vertical path course angular errors from a preset line or glide path beam in space, shown in FIGURE 3, and which may be transmitted from suitable ground based transmitting equipment and inclined from the horizontal by, for example, a nominal three degrees to provide a descent path terminating on the runway.

The glide path beam receiver 30 is operatively connected through suitable electrical output conductors 32 to the input of a conventional variable gain amplifier 34 having output conductors 36 connected to the input of a conventional approach pitch coupler 38.

The approach coupler 38 is in turn connected through output conductors 40 to the input of the autopilot or flight director 26 for controlling the pitch of the aircraft about a pitch axis thereof in a conventional manner. The glide path beam receiver 30 provides suitable control signals in response to course angular errors from the glide path beam sensed thereby.

The variable gain amplifiers 14 and 34 and the roll limiter 22 are operatively connected by output conductors 42, 44 and 46, respectively, leading from the electronic desensitization means 50, shown diagrammatically in FIGURE 1, so as to be controlled by an input signal applied therethrough by a radio altimeter 52, as modified by the operation of the desensitization means 50, as hereinafter explained in greater detail.

The radio altimeter 52 may be of a conventional type carried by the aircraft in flight and arranged to provide a direct current output signal across conductors 55 and 59 proportional to the altitude of the aircraft above the terrain. The conductor 55 carrying a negative charge may be connected to a common ground, while the conductor 59 having a positive potential is connected to an input of the electronic desensitization means 50.

The radio altimeter 52 is so arranged that the magnitude of the direct current signal $H_{RA}$ applied across the conductors 55–59 is decreased with the sensed altitude as the aircraft descends to the runway to provide at the output lines 42, 44 and 46 of the desensitizing device 50 a positive output signal voltage $e_2$ proportional to the signal $H_{RA}$ and which decreases in magnitude with such sensed altitude so as to in turn decrease the gain of the variable gain amplifier 14 connected between the localizer receiver 10 and the approach roll coupler 18 and decrease the gain of the variable gain amplifier 34 connected between the glide path receiver 30 and the approach pitch coupler 38 with the decrease in the sensed altitude as well as reset the roll limit of the roll command limiter 22 in a roll command restricting sense with such decrease in the sensed altitude.

The electronic desensitization means 50 disclosed herein and responsive to the direct current altitude signal applied across the lines 55–59 by the radio altimeter 52 is arranged to provide a gain program without any presetting by the pilot and a correct gain at low altitudes irrespective of the initial altitude of the landing approach by the aircraft.

Figure 4:
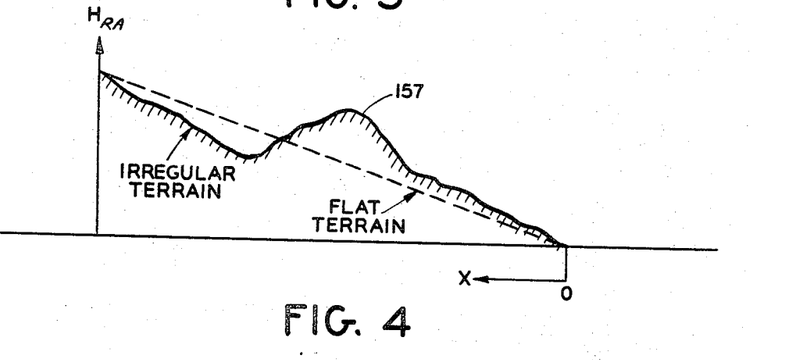
FIGURE 4 illustrates pictorially flat and irregular terrain including a hill which would be sensed by an airborne radio altimeter in following the glide path shown in FIGURE 3 as a decrease in the effective altitude of the aircraft.
Figure 5:
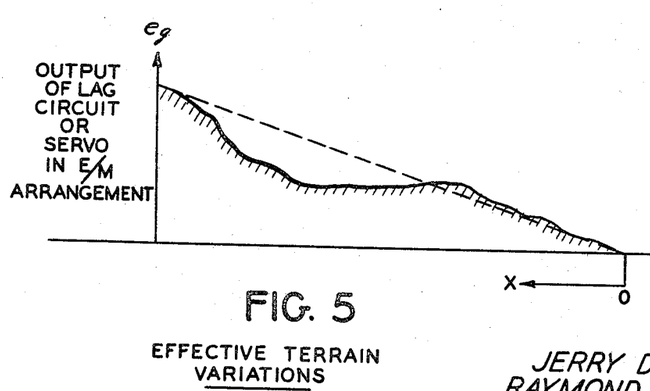
FIGURE 5 illustrates operation of the desensitizing means in a glide path approach of an aircraft to a landing runway over an assumed model of terrain variations.

Further, extensive analog computer tests have shown that the desensitization means, herein described, also minimize the effects of terrain variations, such as shown in FIGURES 3, 4 and 5, on the fluctuations in the approach coupler gain parameters.

In the implementation shown in FIGURE 1, the direct current signals of the electronic desensitization means 50 at the respective output lines 42, 44 and 46 will follow the altitude responsive direct current input signal $H_{RA}$ applied to the input line 59 only for sensed decreasing input altitude signals, while the electronic desensitization means 50 will hold the output signals at lines 42, 44 and 46 to the last minimum value for the sensed input altitude signal until the sensed input altitude signal falls below that last minimum sensed altitude value and in this respect the operation of the electronic desensitization means 50 is analogous to the operation of a ratchet in effecting such change only in an altitude decreasing sense. Moreover, the output signal applied at the lines 42, 44 and 46 lags the altitude input signal at line 59 by a preset time constant and the output is further rate limited so that very rapid reductions in the sensed input radio altitude signal at the line 59 is followed at a fixed rate.

In effecting the aforenoted mode of operation, the electronic implementation of the desensitization means 50 of FIGURE 1 receives a direct current output signal from the radio altimeter 52 proportional to the prevailing altitude of the aircraft above the terrain and indicated by the symbol $H_{RA}$ and which signal has a positive potential applied through conductor 59 to the input of a limiter circuit 62, including a first stage direct current operational amplifier 64 having an input conductor 59 and a grounded input 59A as well as a positive output conductor 68 and a negative grounded output 67, together with a second stage direct current operational amplifier 66 having an input conductor 68 and a grounded input 67A as well as a positive output conductor 70 and a grounded negative output conductor 71. Both of the amplifiers 64 and 66 are of conventional direct current amplifier types. The amplifier 64 provides a positive output signal voltage applied through the conductor 68 extending from the output of the amplifier 64 to the input of the amplifier 66. The second stage amplifier 66 has an output conductor 70 carrying positive output voltage $e_1$ and leading to a filter circuit 72. The limiter 62 includes a circuit 73 for controlling or setting the limit thereof controlled by a positive voltage $e_2$ at the output of the filter circuit 72, as hereinafter explained.

The filter circuit 72 includes resistor element 74 connected to the input line 70 with the resistor element 74 connected through a diode device 84 to a conductor 78. The diode device 84 has unidirectional current conduction characteristics and an anode element 86 connected to resistor 74 and a cathode element 88 connected to conductor 78. The diode 84 is arranged so as to be conductive of current flow from resistor 74 to conductor 78 while preventing current flow in a reverse direction from conductor 78 to resistor 74, except, of course, in the event the diode 84 is not sufficiently back biased to cut it off, as hereinafter explained.

The conductor 78 is connected to the input of a conventional type direct current amplifier 80 including an opposite grounded input 78A and having an output line 82 providing a positive potential output voltage $e_2$ and a negative output line 82A connected to a common ground. There is also provided a resistor 85 connected at one end through a conductor 90 to the conductor 78 and at an opposite end to a negative terminal of a battery or suitable source of electrical energy 91 having a positive terminal connected to a common ground. Further, there is provided a capacitor 92 having one plate connected to the conductor 90 and an opposite plate connected through a conductor 94 to the common ground and thereby to the grounded input conductor 78A of the direct current amplifier 80.

The filter 72 is arranged to provide a lag and rate limit circuit whose positive output $e_2$ at the line 82 lags the signal $e_1$ at the conductor 70. Further, the lagging effect of the filter circuit 72 also operates as a result of an action of the diode 84 in such a way that the voltage applied across the capacitor 92 can change at a rate up to a fixed value set by the voltage applied across the diode 84.

Thus, as the voltage $e_1$ decreases, at a predetermined normal rate, in response to the radio altimeter signal $H_{RA}$ as the aircraft nears the ground, the voltage across the capacitor 92 is allowed to follow the normal rate of decrease of $e_1$, since the diode 84 is so arranged that under such normal decreasing rate of voltage $e_1$ the diode 84 is not back biased sufficiently to cut it off so that the positively charged plate of the capacitor 92 in such case may discharge by a reverse flow of current through conductors 90 and 78, diode 84 and resistor 74 as well as through resistor 85 to the negative terminal of battery 91, and thus making the discharging time $\tau_{D_1}$ of the capacitor 92 equal to $$C_{92}\left(\frac{R_{74}R_{85}}{R_{74}+R_{85}}\right)$$

However, when the voltage $e_1$ decreases more rapidly than the predetermined normal rate, as when the aircraft passes over a hill, the positively charged plate of the capacitor 92 is prevented from discharging at such more rapid rate and through the diode 84 by the operation of the diode 84 which is now back biased sufficiently to cut it off. The capacitor 92 can then only discharge through the resistor 85 and at a time constant $\tau_{D_2}=C_{92}R_{85}$, which is arranged to be much slower than the normal discharge time constant $\tau_{D_1}$. In effecting these time constants, the arrangement is such that the amplifier 66 has a very low output impedance while the amplifier 80 has a very high input impedance. The capacitor 92 can only discharge to the voltage $e_1$, since the diode 84 becomes forward biased if it discharges further. This forward biasing would recharge the capacitor to the value of $e_1$.

The gain of the filter 72 is so set as to provide an output voltage $e_2$ at the output line 82 which is proportional to the radio altimeter signal $H_{RA}$ applied at the line 59 and which is applied to the lines 42–42A and 44–44A through the output conductor 82 and grounded output conductor 82A so as to drive the variable gain amplifiers 14 and 34, respectively, for the approach couplers 18 and 38 of the autopilot or flight director 26 so as to provide the desired program action in accordance with the radio altimeter signal. This output voltage $e_2$ applied to the lines 82–82A and thereby also to the lines 46–46A leading to the roll command limiter 22 is such as to set the roll command limiter 22 to the prescribed value for the effective sensed altitude above the terrain.

The limiter 62 includes the circuit 73 for setting the limit thereof in which there is provided a diode device 100 having unidirectional current conduction characteristics and an anode element 102 connected through a conductor 104 to the conductor 68 connecting the positive output and input of the amplifiers 64 and 66, and a cathode element 106 connected to a point 107 intermediate a resistor 108 and a resistor 109. The resistor element 108 is connected at an opposite end to a conductor 110, while the resistor element 109 has an opposite end connected to ground by a conductor 111. The diode 100 is so arranged as to be conductive of current flow from conductors 68 and 104 to point 107 while preventing a current flow in a reverse direction from point 107 to conductors 104 and 68.

The conductor 110 is connected at one end to a switch arm 112 which may be operated by the pilot so as to selectively close a switch contact 114 and a second switch contact 115. The switch contact 115 is connected through a conductor 117 to the output conductor 82 leading from the amplifier 80 of the filter circuit 72, while the switch contact 114 is connected through a conductor 119 to the positive terminal of a battery 120 having a negative terminal connected through a conductor 122 to a common ground.

The conductor 110 is also connected to a resistor 128 connected to a conductor 130 leading to the input of a comparator 132. Also leading to the input conductor 130 is a second resistor 134 leading through a conductor 136 from the input conductor 59. The resistors 128 and 134 provide a summing resistor arrangement whereby the feedback signal applied through the conductor 110 is algebraically summed with the input signal applied through the resistor 134 from the input conductor 59 so that the comparator 132 may sense a predetermined difference therein, as hereinafter explained.

Moreover, upon the switch 112 being adjusted by the operator to a downward position so as to open switch contact 114 and to close the switch contact 115 for operation during normal approach of the aircraft to the landing runway, it will be seen that the positive output voltage $e_2$ applied then through the feedback conductor 117, contact 115, switch arm 112, and conductor 110 is applied through the resistor 108, resistor 109, and conductor 111 to ground. The voltage across resistor 109 biases the diode 100 so as to set the limiting value of the input limiter 62.

Thus, as the aircraft descends on an approach to the runway, the voltages $H_{RA}$ and $e_1$ and $e_2$ are all being reduced proportionally while the voltage across the diode 100 is arranged to be zero through proper scaling of the positive voltage outputs of amplifiers 64 and 80. The voltage across resistor 109 then acts to bias the diode 100 so that it cannot conduct until the output voltage at amplifier 64 becomes greater than the voltage across 109. The diode 100 is therefore ineffective for altitude reductions.

If the altitude increases, then the voltage $e_2$ is proportionately smaller than the output voltage of the amplifier 64. The voltage $e_2$ applying a positive potential at line 82 forces a current through conductor 117, resistors 108 and 109 to ground through conductor 111 and returning to the negative conductor 82A of the amplifier 80 so as to cause a voltage across resistor 109 which is now less than the positive output voltage of amplifier 64 applied to conductor 68 so that the diode 100 conducts a flow of current from conductors 68 and 104 to point 107 and through resistor 109 to ground so as to reduce the voltage at the input 68 to amplifier 66 to the value it had just before the voltage of the altitude signal $H_{RA}$ increased. The diode 100 thereupon acts to clamp the voltage output of amplifier 64 which is designed to have a relatively high output impedance. The voltage is clamped only if it increases above its previous value. Once the diode 100 clamps the output of amplifier 64, then the output of amplifier 66 is also effectively held at the same level. This forces the capacitor 92 to retain its positive charge, and to "remember" the last lowest altitude. If the altitude signal $H_{RA}$ again decreases below the previous low value, then the diode 100 ceases to conduct since the voltage across resistor 109 is larger than the voltage output of amplifier 64 and the diode 100 is so arranged as to prevent a reverse flow of current from point 107 to conductors 104 and 68. In this case, the voltage output of amplifier 66 is also reduced in accordance with the decrease in the altitude and thus in the signal $H_{RA}$ thereby causing the capacitor 92 to discharge through the diode 84 and resistor 74 as well as resistor 85 under normal rates of decrease of $e_1$ or through resistor 85 alone under more rapid rates of decrease of $e_1$, as heretofore explained, and to reduce the voltage $e_2$ accordingly. If the altitude increases again, effecting an increase in the altitude signal $H_{RA}$, the operation is as heretofore described.

*Operation of electronic desensitization means*

Thus, as the radio altitude signal $H_{RA}$ applied to the input conductor 59 is reduced during the normal approach of the aircraft over a flat terrain to the runway, the limiter 62 will be set to approximately the same voltage as that provided at the input conductor 59 by the radio altimeter 52. If the terrain is uneven, and if there is a momentary increase in the radio altitude signal, as may result, for example, upon the aircraft flying over a valley 150, as indicated diagrammatically in FIGURE 3, the output of the limiter 62 will be prevented from following the increased direct current altitude signal effected by the radio altimeter across the lines 55–59 to the electronic desensitizing means 50. This inhibiting effect may be partial or complete depending upon the setting of the limiter 62.

On the other hand, if the aircraft were to pass over a hill, such as indicated at 155 of FIGURE 3, or 157 as indicated in FIGURE 4, during a descent of the aircraft in following a glide path beam 159, as indicated in FIGURE 3, the altitude signal supplied by the radio altimeter 52 to the input line 59 would momentarily decrease more rapidly. The output voltage $e_1$ applied then to the output conductor 70 of the limiter 62 would in this case be less than the previously indicated altitude signal, but the lag circuit 70, 74, 78, 84, 85, 90, 91, 92 and 94 of the filter 72 would in this case follow this reduction in altitude only within the preset rate limits provided by such circuit of the filter 72.

Thus, it will be seen that increases in the sensed altitude may be partially or completely rejected by the electronic desensitization means 50 depending upon the setting of the limiter 62, while effects of rapid reduction in altitude would be greatly attenuated at the output conductor 82 by the lag and rate limiter circuit 70, 74, 78, 84, 85, 90, 91, 92 and 94 of the filter circuit 72. Inasmuch as the normal rate of altitude descent of conventional aircraft is, for example, about ten feet per second, the preset rate of descent limit provided by the filter circuit 72 may be set to, for example, about thirty feet per second to provide reasonable synchronization and reset time intervals.

In the event that the output signal $e_2$ at the output conductor 82 from the filter circuit 72 is at a low voltage at the beginning of an approach to a landing operation, the switch 112 has been provided so that the operator may selectively adjust the switch 112 to close the switch contact 114 and apply to the limit circuit 62 a direct current biasing voltage provided from the battery 120 to reset the output $e_2$ at the conductor 82 to a desired high altitude condition immediately prior to beginning the approach of the aircraft to the landing operation.

Thus, the pilot operates the switch 112 to close the contact 114 to condition the electronic desensitization means 50 so that the radio altimeter signal $H_{RA}$ applied to the input conductor 59 may reset the output signal $e_2$ at the conductor 82 to the desired value at the beginning of the approach descent.

Immediately upon the approach descent being initiated, the switch 112 is positioned by the operator so as to open the contact 114 and close switch contact 115, whereupon the feedback signal $e_2$ applied through the conductor 117 is effective to automatically set the limiter 62 through the action of the setting circuit 73 including the resistors 108 and 109 and the diode 100, as heretofore explained.

The comparator 132 is a conventional monitor unit which may include suitable threshold, lag and biasing circuitry to control a suitable relay device not shown and effective through output conductors 160 to initiate operation of a suitable warning indicator 162 upon the output of the conductor 82 failing to follow reductions in the radio altitude signal applied at the input 59 within predetermined safe operating limits. The warning indicator 162 may be a visual indicator such as a light, an audible indicator such as a siren, or a mechanical indicator such as a flag, all of which are of a type well known in the art.

If a failure to follow the decreasing altitude signal is detected, as upon the algebraic sum of the signals applied through the resistors 128 and 134 being equal to a predetermined differential value, the warning device 162 is rendered effective to alert the pilot of the aircraft to such condition.

*Electromechanical desensitization means*

Figure 2:
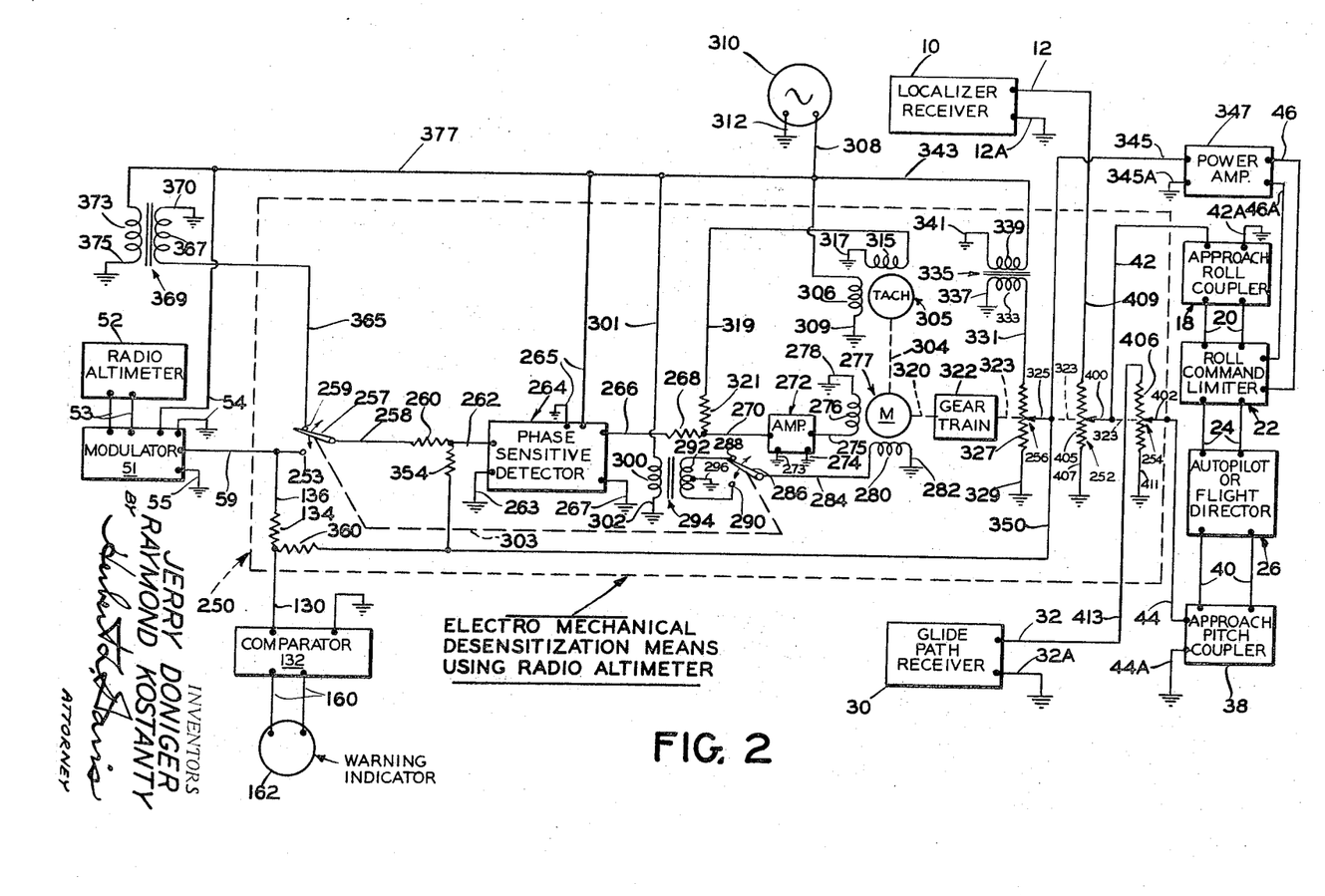
FIGURE 2 is a wiring diagram of an electromechanical desensitization device embodying the present invention and shown in cooperative relation with an altitude responsive aircraft landing system.

A second form of the invention is shown in FIGURE 2 as an electromechanical desensitization on means 250 operatively arranged in an aircraft landing system in which corresponding parts described with reference to FIGURE 1 have been indicated by corresponding numerals. The form of the invention, shown in FIGURE 2, differs from the electronic desensitization means 50 of FIGURE 1, in that the desensitization means 250 includes an electromechanical servo which is used to provide the lag, rate limit and minimum sensed altitude hold features of the electronic desensitization means 50 of FIGURE 1.

The output signals applied through the conductors 42–42A and 44–44A to control the approach roll coupler 18 and the approach pitch coupler 38, respectively, and the output signal applied to the conductors 46–46A to control the roll command limiter 22 are provided through the operation of suitable potentiometers 252, 254, and 256, adjustably positioned by the electromechanical servo in the desensitization means 250 of FIGURE 2 instead of through the provision of the control voltages applied through the conductors 42–42A and 44–44A to the variable gain amplifiers 14 and 34, respectively, and through the conductors 46–46A to the roll command limiter 22 by the electronic densitization means 50 of FIGURE 1.

In the form of the invention shown in FIGURE 2, the radio altimeter 52 applies a direct current output voltage proportional to the sensed altitude through conduits 53 to the input of an alternating current modulator 51 connected to a suitable source of constant frequency alternating current 310 through conductors 54. The modulator 51 has output conductors 55 and 59. The conductor 55 is connected to a common ground while the conductor 59 leads to a switch contact 253 which may be selectively closed by an operator-operative switch arm 257. The arm 257 is arranged to alternatively selectively close a second switch contact 259.

The switch arm 257 is connected through a conductor 258 and a resistor element 260 to an input conductor 262 leading to a conventional phase sensitive detector 264. The detector 264 has another input conductor 263 connected to a common ground and an output conductor 266 leading therefrom together with a grounded output conductor 267. The phase sensitive detector 264 is operably connected to the cource of constant frequency alternating current 310 through conductors 265. The output conductor 266 from the phase sensitive detector 264 leads through a resistor element 268 and a conductor 270 to the input of the servo amplifier 272 having a grounded input conductor 273 and a grounded output conductor 274 and an output conductor 275 leading to control phase winding 276 of servo motor 277. The winding 276 has an opposite end thereof connected to a grounded conductor 278. The servo motor 277 has a fixed phase winding 280 connected at one end to a common ground conductor 282 and at an opposite end connected through a conductor 284 to a switch arm 286.

The switch arm 286 is arranged to selectively close switch contacts 288 and 290 connected to opposite ends of a secondary winding 292 of a transformer 294 having a center tap connected by a conductor 296 to a common ground. The transformer 294 has a primary winding 300 connected across the suitable source of constant frequency alternating current 310 through conductor 301 and grounded conductor 302. The switch arm 286 may be connected through suitable linkage 303 so as to be operated in unison with the switch arm 257 by the operator. Thus, upon the operator positioning the switch arm 257 to the down position, so as to close contact 253, the switch arm 286 will be simultaneously positioned to close switch contact 290 for normal operation of the motor 277. However, upon switch arm 257 being adjusted to the up position, as shown by FIGURE 2, to close contact 259, the switch arm 286 will be simultaneously positioned to the up position to close contact 288 to shift the phase of the alternating current applied to the fixed phase winding 280 of the servo motor 277 one hundred and eighty degrees for a purpose hereinafter explained in greater detail.

The rotor of the servo motor 277 is drivingly connected through a shaft 304 to the rotor of an alternating current rate or tachometer generator 305 having a fixed phase winding 306 connected through a conductor 308 and a grounded conductor 309 across the source of constant frequency alternating current 310 having a grounded output conductor 312.

The rate generator 305 has an output winding 315 having a grounded output conductor 317 and a conductor 319 connected through a resistor 321 to the input conductor 270 leading to the amplifier 272. The resistor 268 and the resistor 321 provide a summing resistor arrangement whereby an alternating current output signal from the rate generator 305 is algebraically summed with the alternating current signal applied through the resistor 268 to the input 270 of the amplifier 272 providing a rate signal which acts in opposition to the controlling signal applied through the resistor 268 so as to limit the rate of adjustment of the motor 277 in response to the controlling signal and provide a desirable time lag in the operation of the motor 277 in response to such controlling signal, as hereinafter explained.

Furthermore, the motor 277 positions through an output shaft 320, gearing 322, and output shaft 323 an adjustable arm 325 cooperatively arranged in relation to a resistor element 327 of the potentiometer 256.

One end of the resistor element 327 is connected to a grounded conductor 329, while the opposite end of the resistor element 327 is connected by a conductor 331 to one end of a secondary winding 333 of a transformer 335. The opposite end of the secondary winding 333 is connected to a grounded conductor 337. The transformer 335 has a primary winding 339, one end of which is connected to a grounded conductor 341, while the opposite end is connected through a conductor 343 to the source of alternating current 310.

The adjustable arm 325 of the potentiometer 256 is electrically connected through a conductor 345 to an input of a power amplifier 347 having an opposite input conductor 345A connected to ground and thereby to the grounded conductor 329 from the resistor 327 and the grounded conductor 312 of the source of alternating current 310. The amplifier 347 has output conductors 46–46a leading to control terminals of the roll command limiter 22 for setting the limiter 22, as hereinafter explained.

Further, leading from the potentiometer arm 325 is a conductor 350 for applying an alternating current position follow up signal through a resistor 354 to the input conductor 262 of the phase sensitive detector 264. The input resistor 260 and the position follow up resistor 354 provide a summing resistance arrangement by which the position follow up signal applied by potentiometer 256 is algebraically summed with the controlling signal applied through the resistor 260 and acting in opposition thereto so as to provide a controlling difference signal at the input conductors 262 and 263 of a phase which may be applied through the phase sensitive detector 264 to cause the arm 325 to be positioned by the servo motor 277 so as to follow a change in the altitude sensed by the rado altimeter in a decreasing sense.

However, in the event the signal provided by the radio altimeter 52 be in an altitude increasing sense, then the phase of the controlling difference signal applied at the input 262–263 will be of an opposite phase and a phase such that the phase sensitive detector 264 will prevent the passage thereof so that the servo motor 277 will not rotate in a sense to follow the sensed increase in altitude.

Further, the conductor 350 is connected through a resistor 360 to a conductor 130 leading to the input of a comparator 132. The resistors 134 and 360 provide a summing resistor arrangement whereby the alternating current position follow up signal of one phase applied through the conductor 350 and resistor 360 is algebraically summed with the alternating current input signal of an opposite phase applied through the conductor 136 and resistor 134 and the difference in such opposing signals applied through the input conductor 130 to the comparator 132 which may be of a conventional type effective to energize through output conductors 160 a warning indicator 162 upon the signal applied through the position follow up conductor 350 failing to follow decreases in the altitude, as sensed by the radio altimeter 52, within predetermined safe operating limits.

The switch contact 259 selectively controlled by the pilot operated switch arm 257 is connected through an electrical conductor 365 leading to one end of a secondary winding 367 of a transformer 369 having an opposite end connected to a grounded conductor 370. A primary winding 373 of the transformer 369 has one end connected to a grounded conductor 375 and an opposite end connected through a conductor 377 to the conductor 308 leading from the source of constant frequency alternating current 310.

Further, it will be seen that the output shaft 323 of the servo motor 277 is operatively connected to an adjustable potentiometer arm 400 and an adjustable potentiometer arm 402. The adjustable arm 400 is cooperatively arranged in relation to a resistor element 405 of the potentiometer 252 while the adjustable potentiometer arm 402 is cooperatively arranged in relation to a resistor element 406 of the potentiometer 254.

One end of the resistor element 405 is connected to a grounded conductor 407 while the opposite end of the resistor element 405 is connected by a conductor 409 to an output terminal 12 of the localizer receiver 10 having an opposite output terminals 12A connected to a common ground. Thus, the output terminals 12 and 12A of the localizer receiver 10 are connected across the resistor element 405 of the potentiometer 252. The adjustable arm 400 of the potentiometer 252 is connected by conductor 42 to an input terminal of the approach roll coupler 18. The opposite input terminal 42A of the approach roll coupler 18 is connected to a common ground and thereby to the grounded conductor 407 leading from the resistor 405 and to the grounded conductor 12A of the localizer receiver 10.

Similarly, one end of the resistor element 406 is connected to a grounded conductor 411 while the opposite end of the resistor element 406 is connected by a conductor 413 to an output terminal 32 of the glide path beam receiver 30 having an opposite output terminal 32A connected to a common ground. Thus, the output terminals 32 and 32A of the glide path beam receiver 30 are connected across the resistor element 406 of the potentiometer 254. The adjustable arm 402 of the potentiometer 254 is connected by conductor 44 to an input terminal of the approach pitch coupler 38. The opposite input terminal 44A of the approach pitch coupler 38 is connected to a common ground and thereby to the grounded conductor 411 leading from the resistor 406 and to the grounded conductor 32A of the glide path beam receiver 30.

*Operation of electromechanical desensitization means*

In the implementation of FIGURE 2, the servo motor 277 operates in a conventional manner when the radio altitude signal is being reduced. With the switches 257 and 286 in the "approach" position closing the contacts 253 and 290, respectively, the difference between the radio altimeter signal $H_{RA}$ and the output voltage of the follow up potentiometer 256 are applied through the conventional phase sensitive detector circuit 264 to the servo amplifier 272 which applies the required variable phase voltage to the control winding 276 so as to drive the two phase alternating current motor 277, gear train 322 and potentiometers 252, 254 and 256.

However, when the radio altimeter voltage across lines 55–59 increases, as in the case of flight over a valley 150 of FIGURE 3, then the phase sensitive detector 264 causes a null voltage to exist at the input to the servo amplifier 272, thereby inhibiting the operation of the servo motor 277 in this situation. Again, once the radio altitude voltage is reduced below the previous minimum value, the servo motor 277 again follows the altitude signal. The tachometer feedback 305, the position feedback 256, and the maximum speed of the servo motor 277 are selected to provide a desirable time lag and a desirable altitude rate limit which the servo motor 277 can follow.

In order to insure that the servo is initially ready to reduce the coupler gain parameters, a fixed bias is injected upon the switch arm 257 closing the switch contact 259 prior to the initiation of the landing approach. Since the phase sensitive detector 264 will not allow the motor 277 to run when the phase of the input signal corresponds to that effected upon an increasing altitude, the alternating current bias supplied by the transformer 369 must therefore be of a phase corresponding to that effected upon a reduction in altitude. It should be noted, however, that the fixed phase winding 280 of the motor 277, simultaneously with switch 257 closing contact 259, is then connected by switch 286 closing contact 288, as shown in FIGURE 2, to an excitation voltage supplied by the transformer 294 of opposite phase from that supplied during normal excitation as upon switch 286 closing contact 290, so that the motor 277 is now caused to rotate in a reverse direction from normal altitude decreasing operation so as to position the follow up potentiometer 256 to its high altitude position and the potentiometers 252 and 254 to corresponding positions for such high altitude operating condition.

Upon the switch arms 257 and 286 being repositioned to close the switch contacts 253 and 290, respectively, normal operation may be resumed in which as the sensed effective altitude decreases, the follow up potentiometer 256 output voltage is varied as a linear function of the input radio altitude signal $H_{RA}$. This follow up output voltage from the potentiometer 256, in addition to effecting the follow up action, heretofore described, is also used to drive the conventional roll attitude command limiter 22 to provide a desirable reduction of the limited roll attitude command with decreases in altitude.

The two potentiometers 252 and 254 also driven by the servo motor 277 are provided to directly adjust the localizer and glide slope signals, respectively, prior to their further modification in the approach coupler systems 18 and 38, respectively. The output voltage of these potentiometers 252 and 254 is $$e_0 = P\epsilon = KH_{RA}\epsilon = Kx\epsilon = \Delta y$$

where P is proportioned to radio altitude.

If the terrain were flat, then the radio altitude signal would be proportional to the range of the aircraft from the glide path transmitter as shown in FIGURES 3, 4 and 5. Since the beam error signal $\epsilon$ that is received in the aircraft is $$\epsilon = \frac{\Delta h}{x} \approx \frac{\Delta h}{H_{RA}/\tan_\eta}$$

the sensitivity of the beam error signal increases as the range or altitude decreases. The desensitization circuit therefore is used to lower the gain of the error signal, before it is further modified by the approach coupler or flight director so that a constant gain is produced $$\epsilon \cdot D = \frac{\Delta h}{H_{RA}/\tan_\eta} x D$$

if $D = H_{RA}/\tan_\eta$ then $\epsilon \cdot D = \Delta h$. The signal $\Delta h$ used by the computer is therefore independent of range.

Attention is directed to the following features of the aforementioned devices of FIGURES 1 and 2:

(1) The provision of novel means to prevent, partially or completely, the output control signal from following increasing altitude signal excursions of $H_{RA}$.

(2) The provision of additional novel filtering means in the form of lag time constants and rate limiting to prevent excessively fast changes in the output control signal in the event of rapidly decreasing altitude signal excursions of $H_{RA}$.

While two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a control system of a flight vehicle, said control system being responsive to signals from a land based signal transmitting means, said control system including means for receiving signals from said transmitting means, variable means for operatively connecting said signal receiving means in controlling relation in said system, and means responsive to altitude of the flight vehicle relative to the land for generating a signal in accordance with variable contours of the land; the improvement comprising means operatively connecting the altitude responsive means to the variable connecting means so that the generated signal acts to control the variable connecting means only in a sense to decrease the operative effect of the variable connecting means and in response to a decrease in the altitude of the vehicle relative to the land.

2. The improvement defined by claim 1 in which said means operatively connecting the altitude responsive means to the variable connecting means includes means responsive to a rate of change of the generated signal in said operative effect decreasing sense for providing a time lag in the control of the variable connecting means by the altitude responsive means.

3. The improvement defined by claim 1 in which said means operatively connecting the altitude responsive means to the variable connecting means includes a first means responsive to a slight rate of change in the generated signal in said operative effect decreasing sense for providing a relatively rapid control of the variable connecting means by the altitude responsive means, and second means responsive to a greater rate of change in the generated signal in said operative effect decreasing sense for providing a relatively slow time lag in the control of the variable connecting means by the altitude responsive means.

4. The improvement defined by claim 1 in which said means operatively connecting the altitude responsive means to the variable connecting means includes means for amplifying said generated signal to provide a signal for controlling said variable connecting means, means for controlling said amplifying means, feedback means including a unidirectional current conduction means for applying said controlling signal to said amplifying control means so as to prevent operation of the amplifying means upon a generated signal effected by the altitude responsive means in accordance with an increase in the altitude of the flight vehicle above a limit set by said controlling signal, and said controlling signal applied by said unidirectional current conduction means to said amplifying control means permitting operation of said amplifying means to reset the signal to control the variable connecting means in the sense to decrease the operative effect of the variable connecting means and upon a generated signal effected by the altitude responsive means in accordance with a decrease in the altitude below the limit set by the preceding controlling signal.

5. The improvement defined in claim 4 including operator-operative means for selectively applying a biasing signal through said unidirectional current conduction means to said amplifying means to reset the limit of the operation of the amplifying means to a predetermined maximum altitude condition.

6. The improvement defined by claim 1 in which said means operatively connecting the altitude responsive means to the variable connecting means includes a servo motor means for controlling said vairable connecting means, means operatively connecting the signal generated by said altitude responsive means to said motor means to control operation thereof, said connecting means including signal selection means for permitting operation of the motor means by said generated signal to control said variable connecting means only in the sense to decrease the operatively effect of the variable connecting means and in response to the decrease in the altitude of the vehicle relative to the land.

7. The improvement defined by claim 6 including operator-operative means for selectively applying a biasing signal to said motor means for effecting operation of said motor means in another sense and so as to increase the operative effect of the variable connecting means to a predetermined maximum condition.

8. In a control system of a flight vehicle, said control system being responsive to signals from a pair of land based signal transmitters, said control system including first and second means for receiving signals from said transmitters, variable gain means for operatively connecting said first and second means in controlling relation in said system, and means responsive to the altitude of said flight vehicle relative to the land for supplying a direct current output signal to control said variable gain means; the improvement comprising an electronic desensitization network including a first direct current amplifying means having a pair of input terminals operatively connected to the direct current output signal supplied by said altitude responsive means, said first amplifying means having a pair of output terminals, a second direct current amplifying means having a pair of input terminals and a pair of output terminals, first means connecting one of the output terminals of the first amplifying means to one of the input terminals of the second amplifying means, and second means connecting the other output terminal of the first amplifying means to the other input terminal of the second amplifying means, a first resistor, a first unidirectional current flow control device, a third direct current amplifying means having a pair of input terminals and a pair of output terminals, said first resistor and said first control device being serially connected between one of said output terminals of the second amplifying means and one of the input terminals of said third amplifying means, said third amplifying means having the other input terminal operatively connected to the other output terminal of said second amplifying means, means operatively connecting the output terminals of said third amplifying means to the variable gain means to operatively control the gain thereof, said first control device being so arranged as to normally conduct a flow of signal current in one sense relative to said first resistor, a second resistor and a source of direct current serially connected across the input terminals of the third amplifying means, said source of direct current being arranged to bias said flow of signal current in said one sense relative to said first resistor and first control device and through said second resistor, a capacitor connected across said second resistor and arranged to be charged upon a change in one sense in the flow of signal current relative to said first resistor and first control device, said capacitor being arranged to effect a current discharge upon a change in an opposite sense in the flow of signal current relative to said first resistor and first control device, said capacitor being so arranged as to effect a time lag between a change in the direct current signal applied at the input of said first amplifying means and a resulting direct current signal applied at the output terminals of the third amplifying means, said first control device permitting a reverse current discharge from the capacitor to be effected through the first and second resistors and first control device at a relatively rapid rate upon a relatively slight change in the signal current in said opposite sense, and said first control device preventing said discharge in the capacitor from being effected through said first control device and first resistor upon a relatively large change in the signal current in said opposite sense so that said discharge of the capacitor may then be effected only through said first resistor and at a relatively slow rate, third and fourth resistors serially connected across the output terminals of the third amplifying means, a second control device having a unidirectional current conduction characteristic, said second control device being connected to a point intermediate said third and fourth resistors and to the first means connecting the output means of the first amplifying means to the input means of the second amplifying means, said second control device being responsive to a difference in voltages at said point intermediate said third and fourth resistors and at said first connecting means so as to limit the effect of changes in one sense in the direct current signal at the input of said first amplifying means on the output across the output terminals of said third amplifying means while permitting the direct current output across the output terminals of said third amplifying means to be varied in accordance with changes in an opposite sense in the direct current signal at the input of said first amplifying means.

9. In a control system of a flight vehicle, said control system being responsive to signals from a land based signal transmitter means, said control system including means for receiving signals from said transmitter means, variable means for operatively connecting said signal receiving means in controlling relation in said system, and means responsive to altitude of the flight vehicle relative to the land for controlling said variable connecting means; the improvement comprising means for operatively connecting the altitude responsive means to the variable connecting means to decrease the operative effect of said variable connecting means with a decrease in the altitude of the vehicle relative to the land, and said operative connecting means including limiting means to render the altitude responsive means at least partially ineffective to vary the operative effect of the variable connecting means upon an increase in the altitude of the vehicle relative to the land.

10. In a control system of a flight vehicle, said control system being responsive to signals from a pair of land based signal transmitters, said control system including first and second means for receiving transmitted signals, variable connecting means for operatively connecting said first and second signals receiving means in controlling relation in said system, and means responsive to said altitude of the flight vehicle relative to the land for generating a signal in accordance with said altitude for controlling said variable connecting means; the improvement comprising means for operatively connecting the altitude responsive means to the variable connecting means to that the generated signal acts to vary the operation of the variable connecting means with a decrease in the altitude of the vehicle relative to the land, and said operative connecting means including means for at least partially inhibiting the effect of the signal generated by the altitude responsive means with an increase in the altitude of the vehicle relative to the land.

11. In a control system of a flight vehicle, said control system being responsive to signals from a pair of land based signal transmitters, said control system including first and second means for receiving transmitted signals, a variable connecting means for operatively connecting said first and second signal receiving means in controlling relation in said system, and means responsive to altitude of the flight vehicle relative to the land for generating a signal in accordance with said altitude for controlling said variable connecting means; the improvement comprising first variable resistor means for controlling the operation of the variable connecting means, second variagle resistor means for providing a variable follow up signal acting in opposition to the signal generated by the altitude responsive signal to provide a resultant control signal, motor means controlled by the resultant signal for adjustably positioning the first and second variable resistor means to thereby adjust the operation of the variable connecting means, means operatively connecting the resultant control signal to the motor means including means for permitting operation of the motor means by said resultant control signal only upon a decrease in the altitude of the flight vehicle relative to the land.

12. In a control system of a flight vehicle, said control system being responsive to signals from a pair of land based signal transmitters, said control system including first and second means for receiving transmitted signals, a variable connecting means for operatively connecting said first and second signal means in controlling relation in said system, and means responsive to altitude of the flight vehicle relative to the land for generating a signal in accordance with said altitude for controlling said variable connecting means; the improvement comprising a desensitization network for operatively connecting the altitude responsive means to the variable connecting means so that the generated signal acts to vary the operation of the variable connecting means, said desensitization network including means rendering the generated signal effective to vary the operation of the variable connecting means upon a decrease in the altitude of the flight vehicle relative to the land and at least partially ineffective to vary the operation of the variable connecting means upon an increase in the altitude of the flight vehicle relative to the land.

13. The improvement defined by claim 12 in which said desensitization network includes means responsive to a rate of change of the generated signal in said decreasing sense for effecting a time lag in the control of the variable connecting means by the altitude responsive means.

14. The improvement defined by claim 12 in which the desensitization network includes a first means responsive to a slight rate of change of the generated signal in said decreasing sense for effecting a relatively rapid control of the variable connecting means by the signal generated by the altitude responsive means, and second means responsive to a greater rate of change in the generated signal in a decreasing sense for effecting a greater time lag in the control of the variable connecting means by the signal generated by the altitude responsive means.

15. For use with control apparatus of a flight vehicle, the combination comprising a source of constant frequency alternating current, a potentiometer means connected to be excited by the alternating current from said source, servo motor means having an output shaft connected to adjust said potentiometer means to modify said alternating current so as to provide first and second alternating current output signals having amplitudes varying with the adjustment of the potentiometer means, a radio altimeter borne by the flight vehicle and operatively connected to said source of alternating current to modify said alternating current so as to provide a third alternating current output signal having an opposite phase from that of the first output signal and an amplitude varying with a sensed altitude of the vehicle above land, means for operatively connecting said second alternating current output signal to the control apparatus for the flight vehicle, means for algebraically summing the first and third alternating current output signals so as to provide a resultant output control signal of a phase dependent upon the sense of the prevailing altitude relative to that of the immediately preceding altitude of the flight vehicle, a phase sensitive detector having input and output means, means operatively connecting the resultant output control signal to the input means of said detector, means operatively connecting the output means of said detector to said motor means to control operation thereof, said phase sensitive detector being operable to selectively inhibit the passage of a resultant control signal having a phase dependent upon an increase in the prevailing altitude sensed by the radio altimeter relative to the immediately preceding altitude of the flight vehicle, and said phase sensitive detector being operable to selectively permit the passage of a resultant control signal having an opposite phase dependent upon a decrease in the prevailing altitude sensed by the radio altimeter relative to the immediately preceding altitude of the flight vehicle so as to thereupon effect the operation of said servo motor means to adjust said potentiometer means so as to vary said second output signal for operating the control apparatus of the flight vehicle.

16. The combination defined by claim 15 including operator-operative means for selectively coupling the source of constant frequency current to said motor means so as to reverse operation thereof and cause the motor means to drive the potentiometer means to a predetermined high altitude initial position.

References Cited
UNITED STATES PATENTS

| | | | |
|---|---|---|---|
| 1,999,047 | 4/1935 | Hahnemann | 343—108 |
| 2,439,044 | 4/1948 | Ferrill | 343—108 |
| 2,599,223 | 6/1952 | Blitz | 343—108 X |

MILTON BUCHLER, *Primary Examiner.*

B. BELKIN, *Assistant Examiner.*